(12) United States Patent
Tang (10) Patent No.: US 10,865,831 B1
(45) Date of Patent: Dec. 15, 2020

(54) SLIDE RAIL

(71) Applicant: HONGFUJIN PRECISION ELECTRONICS(TIANJIN)CO., LTD., Tianjin (CN)

(72) Inventor: Chen-Sheng Tang, New Taipei (TW)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 0 days.

(21) Appl. No.: 16/747,104

(22) Filed: Jan. 20, 2020

(30) Foreign Application Priority Data

Nov. 18, 2019 (CN) .......................... 2019 1 1124980

(51) Int. Cl.
*A47B 88/00* (2017.01)
*F16C 29/00* (2006.01)

(52) U.S. Cl.
CPC .................................. *F16C 29/005* (2013.01)

(58) Field of Classification Search
CPC ....... F16C 29/005; A47B 88/40; A47B 88/44; A47B 88/443; A47B 88/447; A47B 88/45; A47B 88/57
See application file for complete search history.

(56) References Cited

U.S. PATENT DOCUMENTS

| | | | |
|---|---|---|---|
| 3,133,768 A * | 5/1964 | Klakovich | A47B 88/49 384/17 |
| 6,450,600 B1 * | 9/2002 | Chen | A47B 88/493 312/333 |
| 7,008,030 B2 * | 3/2006 | Yang | A47B 88/477 312/334.46 |
| 8,240,789 B2 * | 8/2012 | Chen | F16C 29/046 312/333 |
| 8,528,999 B2 * | 9/2013 | Chen | F16C 29/005 312/334.45 |
| 8,585,166 B2 * | 11/2013 | Chen | A47B 88/493 312/333 |
| 9,939,014 B1 * | 4/2018 | Chiu | F16C 29/10 |
| 2002/0175605 A1 * | 11/2002 | Chen | A47B 88/487 312/333 |
| 2005/0017613 A1 * | 1/2005 | Cirocco | A47B 88/493 312/333 |
| 2006/0120636 A1 * | 6/2006 | Chen | A47B 88/443 384/18 |
| 2008/0100190 A1 * | 5/2008 | Yang | A47B 88/40 312/333 |
| 2008/0246378 A1 * | 10/2008 | Chen | A47B 88/57 312/334.46 |
| 2009/0169140 A1 * | 7/2009 | Chen | A47B 88/493 384/21 |
| 2012/0153792 A1 * | 6/2012 | Yu | F16C 29/048 312/333 |
| 2018/0031037 A1 * | 2/2018 | Chen | A47B 88/43 |

\* cited by examiner

*Primary Examiner* — Matthew W Ing
(74) *Attorney, Agent, or Firm* — ScienBiziP, P.C.

(57) ABSTRACT

A slide rail includes a first rail, a second rail, a third rail, a first resilient member, a second resilient member, and a locking member. When the first rail is pulled out, the first resilient member drives the second resilient member to move along with the first resilient member to pull the second rail. When a receiving slot is aligned with a through slot, a spring piece and the locking member fall into the through slot, the spring piece separates from the first resilient member, the locking member latches onto a first step surface of the through slot to limit movement of the second rail, and the first rail continues to move.

15 Claims, 9 Drawing Sheets

SLIDE RAIL

FIELD

The subject matter herein generally relates to a slide rail, and more specifically to an extendable slide rail.

BACKGROUND

Generally, extendable slide rails have problems of poor connection of multiple slide rails during an extension process and poor stability of extension.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 1:
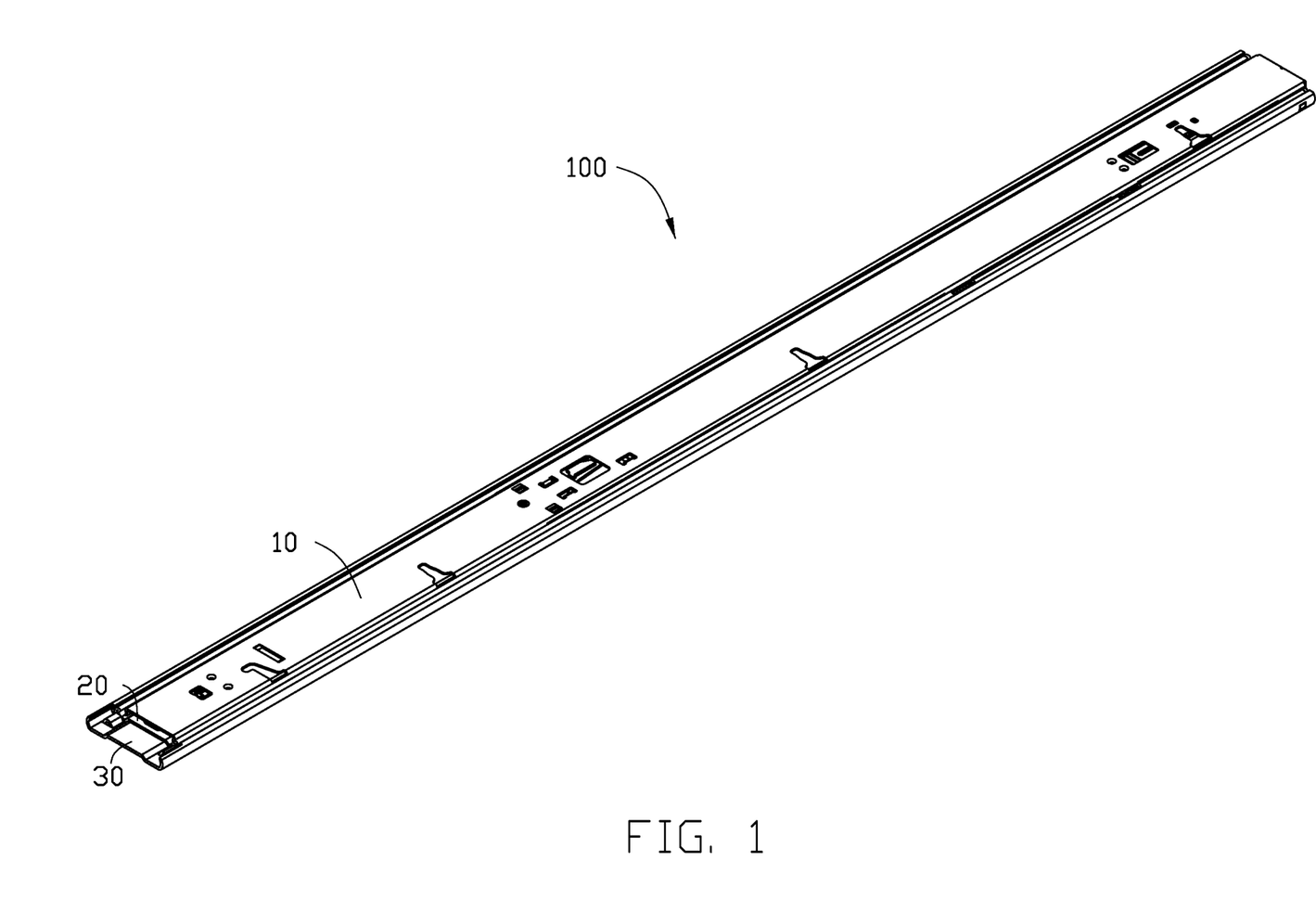
FIG. 1 is an assembled, isometric view of an embodiment of a slide rail.
Figure 2:
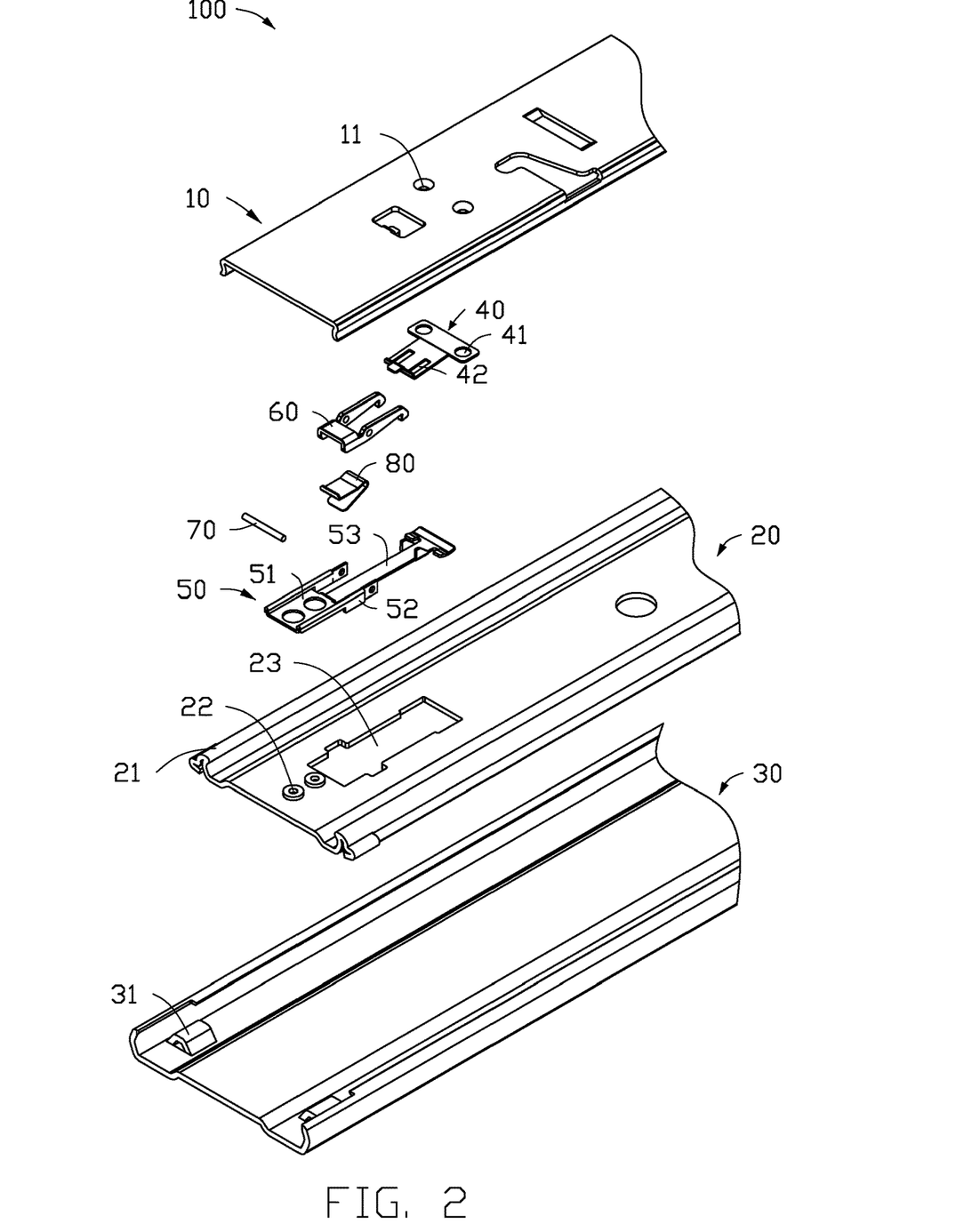
FIG. 2 is a partial exploded, isometric view of the slide rail in FIG. 1.
Figure 3:
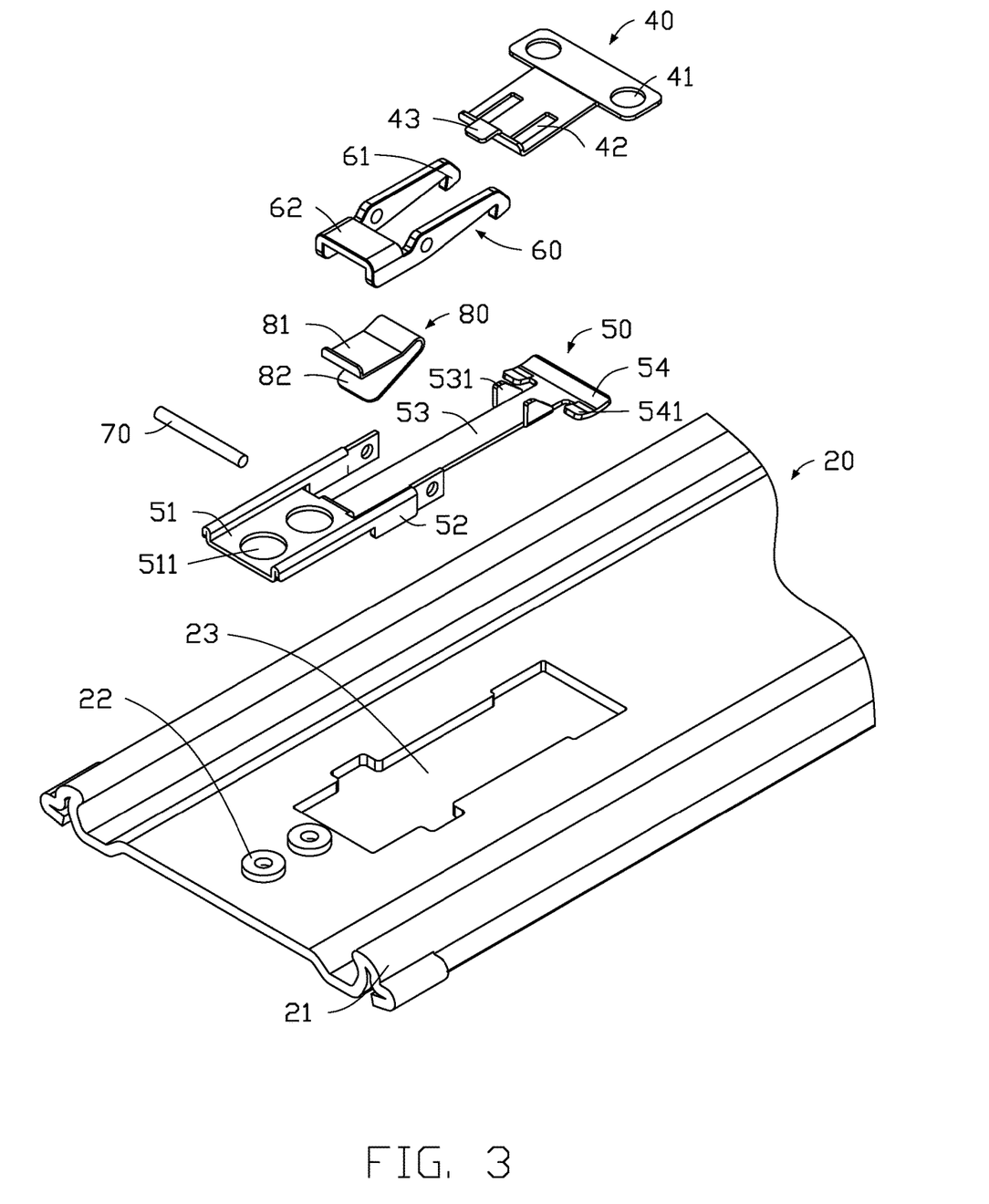
FIG. 3 is another partial exploded, isometric view of the slide rail in FIG. 1.
Figure 4:
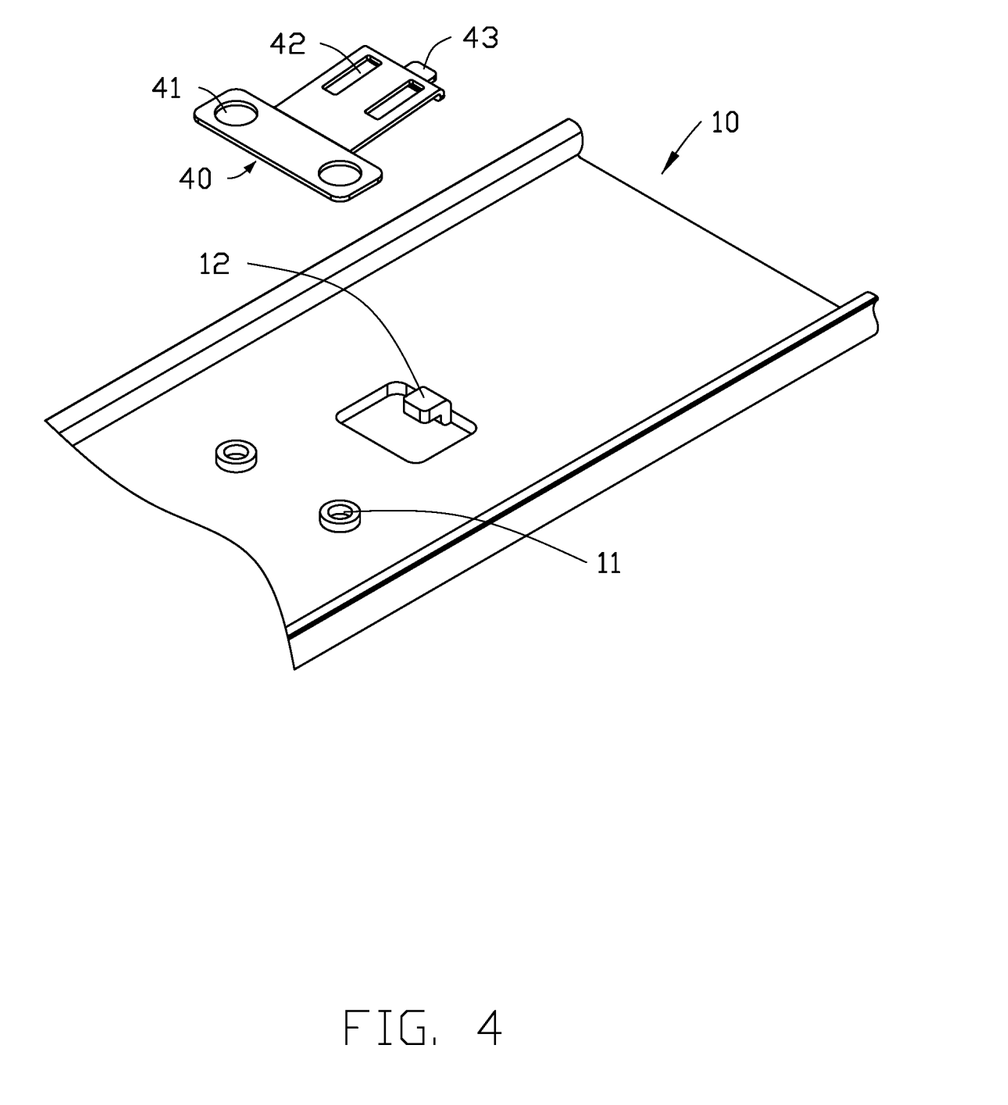
FIG. 4 shows a first rail and a first resilient member.
Figure 5:
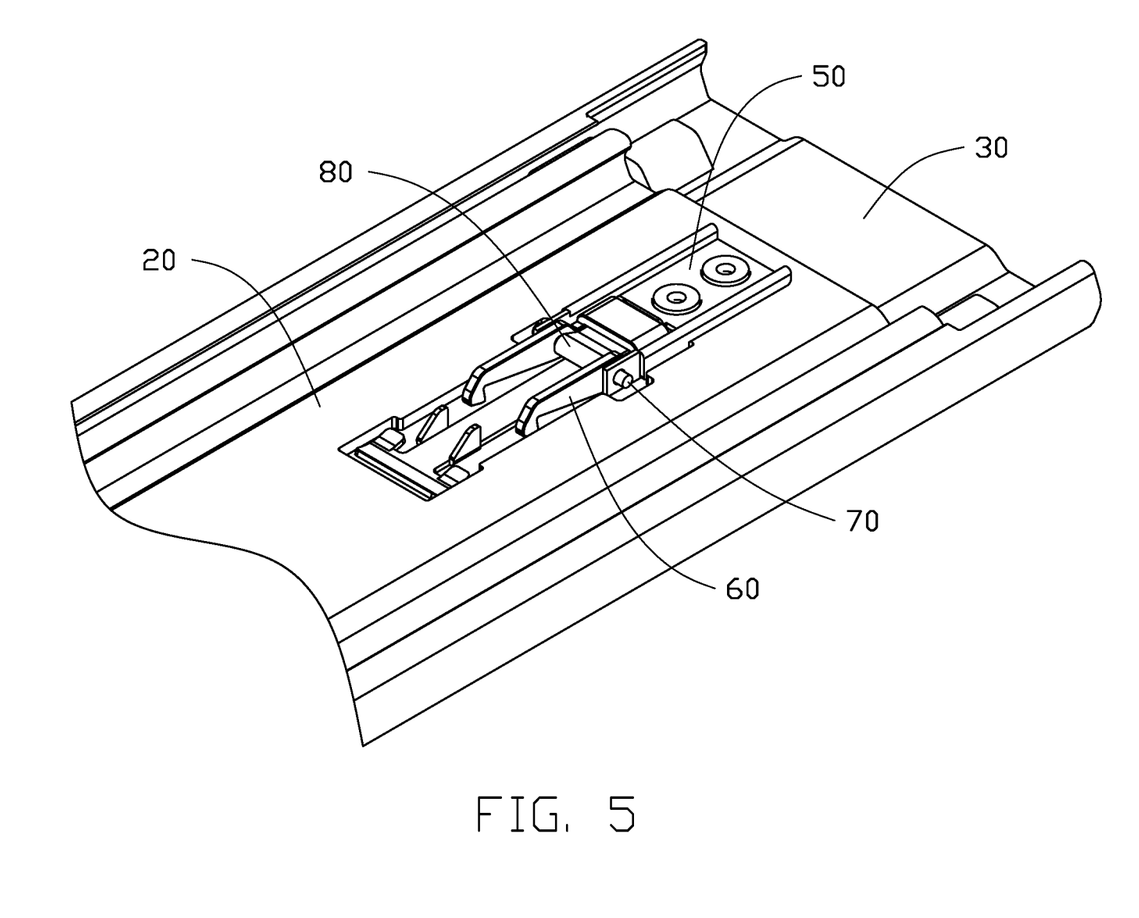
FIG. 5 shows a second rail, a third rail, a second resilient member, a locking member, and a third resilient member.

FIG. 1 and FIG. 2 show an embodiment of a slide rail 100 including a first rail 10, a second rail 20, a third rail 30, a first resilient member 40, a second resilient member 50, and a locking member 60. The first rail 10 is movably mounted on the second rail 20, the second rail 20 is movably mounted on the third rail 30, and the third rail 30 is fixed in position. The first resilient member 40 is mounted on the first rail 10, the second resilient member 50 is mounted on the second rail 20, and the first resilient member 40 and the second resilient member 50 are latched together. The first rail 10 is configured to move along the second rail 20 and drive the second rail 20 to move along the third rail 30 to achieve the purpose of extending the slide rail 100.

Figure 6:
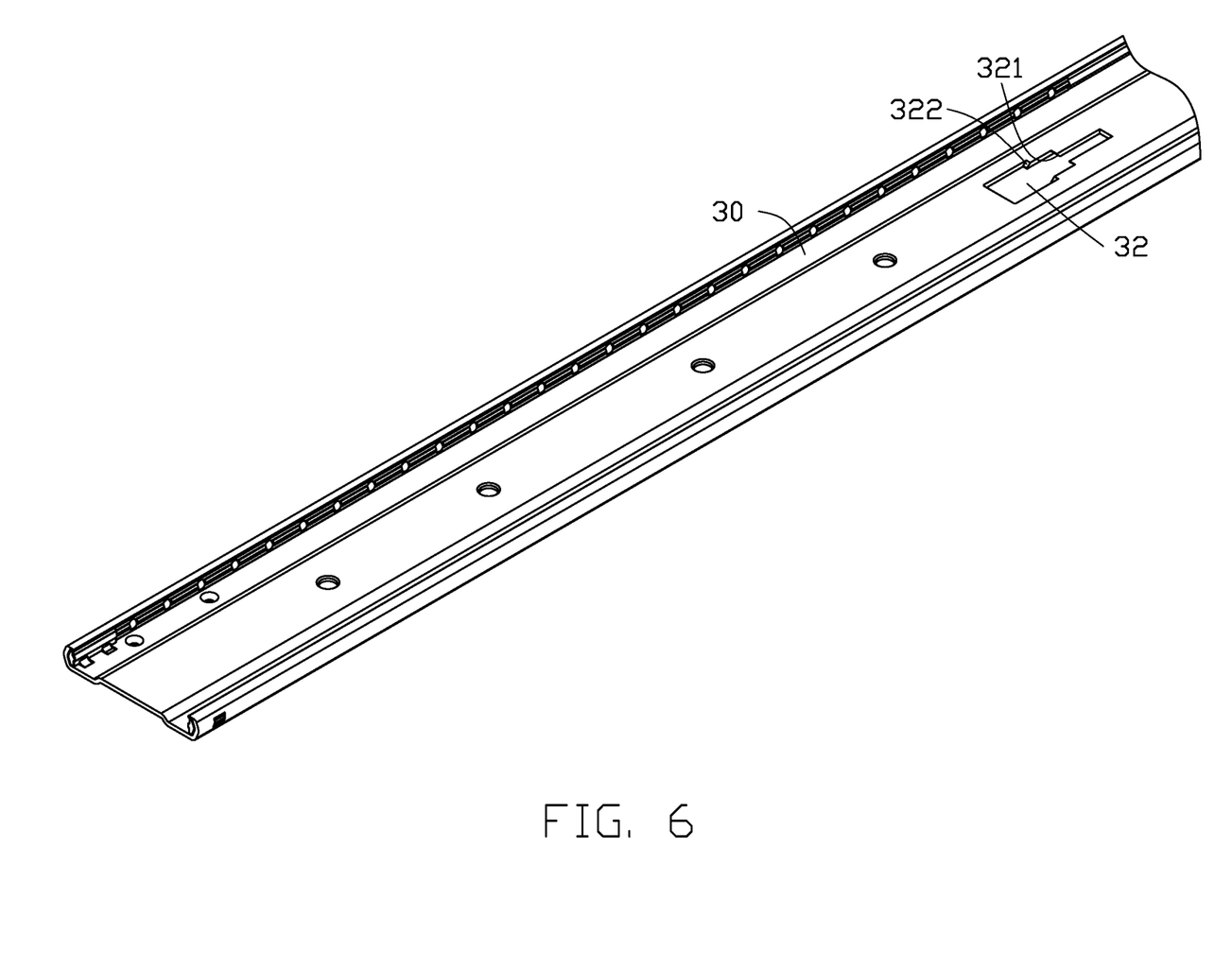
FIG. 6 shows the third rail.

Specifically, the second resilient member 50 includes a fixing plate 51 and a spring piece 53 connected to the fixing plate 51. The fixing plate 51 is fixedly mounted on the second rail 20. One end of the spring piece 53 away from the fixing plate 51 is latched with the first resilient member 40. A receiving slot 23 is defined in the second rail 20, and the spring piece 53 and the locking member 60 are received in the receiving slot 23. A through slot 32 is defined in the third rail 30 (see FIG. 6). When the first rail 10 is pulled out, the first resilient member 40 drives the second resilient member 50 to move to pull the second rail 20. When the receiving slot 23 is aligned with the through slot 32, the spring piece 53 and the locking member 60 fall to the through slot 32, and the spring piece 53 is separated from the first resilient member 40, the locking member 60 latches on a first step surface 321 (see FIG. 6) of the through slot 32 to restrict movement of the second rail 20, and the first rail 10 continues to move outward.

Referring to FIGS. 3-6, the locking member 60 includes two hooks 61 respectively located on two sides of the spring piece 53. The hooks 61 are rotationally mounted to an end of the fixing plate 51 adjacent to the spring piece 53 by a pin 70. Mounting holes 511 are defined in the fixing plate 51, and fixing portions 22 are located on the second rail 20 adjacent to the receiving slot 23. The mounting holes 511 of the fixing plate 51 are respectively riveted to the fixing portions 22 to fix the second resilient member 50 to the second rail 20, and the spring piece 53 connected to the fixing plate 51 is received in the receiving slot 23. One end of the fixing plate 51 connected to the spring piece 53 is provided with two support arms 52 respectively located on the two sides of the spring piece 53. The hooks 61 are rotationally mounted at the end of the support arms 52 by the pin 70. A position of the support arms 52 is higher than a position of the spring piece 53 in the perspective of FIG. 3, it being understood that the hooks 61 are rotationally disposed above the spring piece 53 and capable of rotating on the two sides of the spring piece 53.

The slide rail 100 further includes a third resilient member 80 located between the locking member 60 and the spring piece 53 of the second resilient member 50. One end of the third resilient member 80 abuts against base ends of the hooks 61, and another end of the third resilient member 80 abuts against one end of the spring piece 53 adjacent to the fixing plate 51. In one embodiment, the third resilient member 80 is sleeved on the pin 70 and is a torsion spring or a V-shaped spring piece. The third resilient member 80 includes a first support portion 81 that abuts the locking member 60 and a second support portion 82 that abuts the spring piece 53. A connection joint of the first support portion 81 and the second support portion 82 is sleeved on the pin 70. When the receiving slot 23 is aligned with the through slot 32, front ends of the hooks 61 enter the through slot 32 under an elastic force caused by the first support portion 81 abutting the base ends of the hooks 61, and the front ends of the hooks 61 latch onto the first step surface 321 in the through slot 32. In one embodiment, the number of the hooks 61 is two respectively located on the two sides of the spring piece 53. The base ends of the two hooks 61 are connected by a connecting plate 62. The first support portion 81 abuts the connecting plate 62.

The first resilient member 40 is fixedly mounted on a side of the first rail 10 facing the second rail 20. The first rail 10 is provided with mounting holes 11 for fixing the first resilient member 40. One end of the first resilient member 40 is provided with through holes 41 corresponding to the mounting holes 11, and the through holes 41 are riveted to the mounting holes 11. The one end of the spring piece 53 away from the fixing plate 51 is provided with first protrusions 531, which are substantially wedge-shaped. Latching slots 42 corresponding to the first protrusion 531 are defined in the first resilient member 40. When the slide rail 100 is in a retracted state, the first protrusions 531 are engaged in the latching slots 42. The first rail 10 is further provided with a first buckle 12 for latching the first resilient member 40, and an end of the first resilient member 40 is provided with a second buckle 43 corresponding to the first buckle 12. When the first resilient member 40 is mounted on the first rail 10, the first buckle 12 abuts against the second buckle 43 to prevent a curved end of the first resilient member 40 from overbending due to an elastic force and interfering with movement of the second rail 20.

The one end of the spring piece 53 away from the fixing plate 51 includes a resisting portion 54, and the resisting portion 54 includes two second protrusions 541 extending toward the first protrusions 531. The second protrusions 541 are respectively located on the two sides of the spring piece 53. A second step surface 322 is formed in the through slot 32 of the third rail 30. When the spring piece 53 enters the through slot 32, the second protrusions 541 fall into the through slot 32 from a front end of the second step surface 322, and engagement between the second protrusions 541 and the second step surface 322 causes the first protrusions 531 to be removed from the latching slot 42 of the first resilient member 40. One end of the resisting portion 54 away from the spring piece 53 is bent toward the first rail 10 to form a curved surface. The curved surface of the resisting portion 54 can be used to reduce friction between the second rail 20 and the third rail 30, and when returning to the retracted state, the second resilient member 50 can easily slide out of the through slot 32 of the third rail 30.

Referring to FIG. 2 again, an end of the third rail 30 is further provided with two stopping blocks 31 for respectively blocking two guide portions 21 of the second rail 20 to prevent the second rail 20 from falling out of the third rail 30 during a retracting process.

Figure 7:
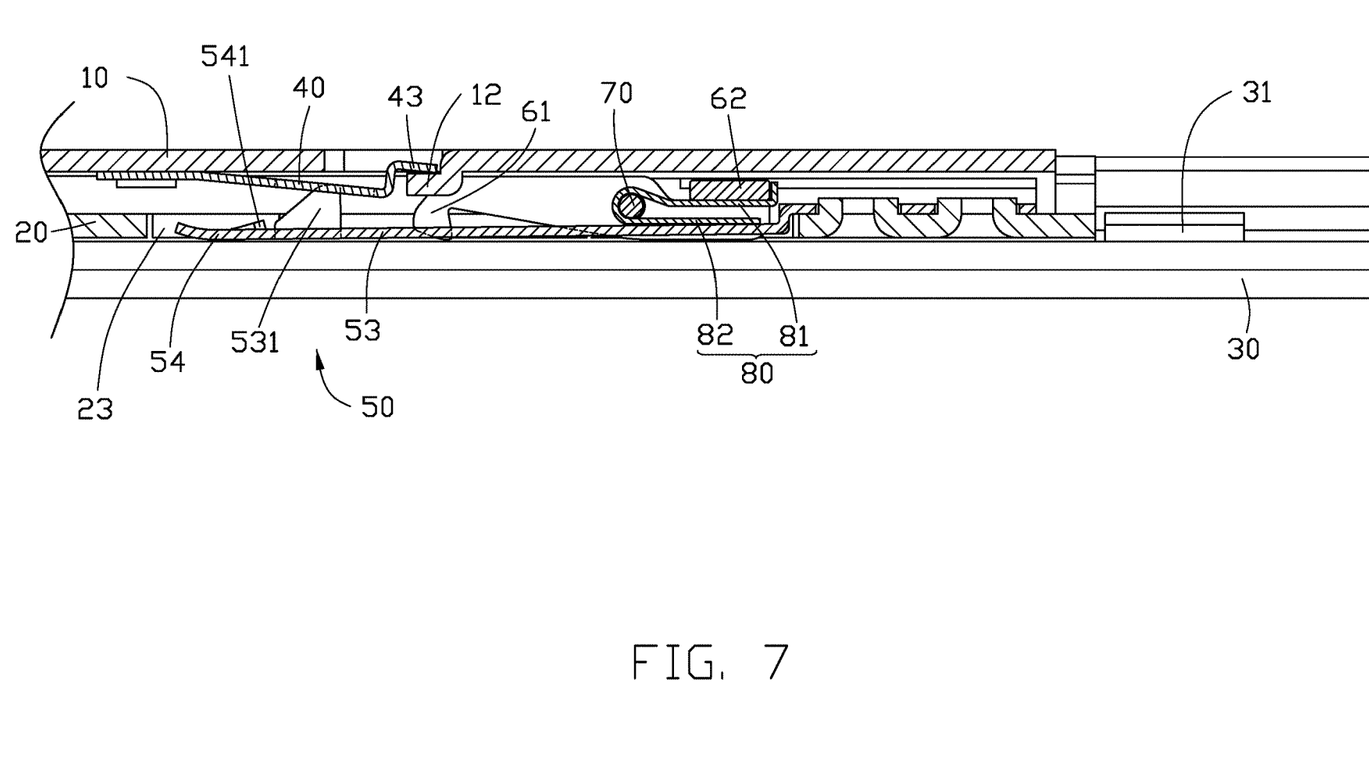
FIG. 7 is a cross-sectional view of the slide rail in an initial (retracted) state.
Figure 8:
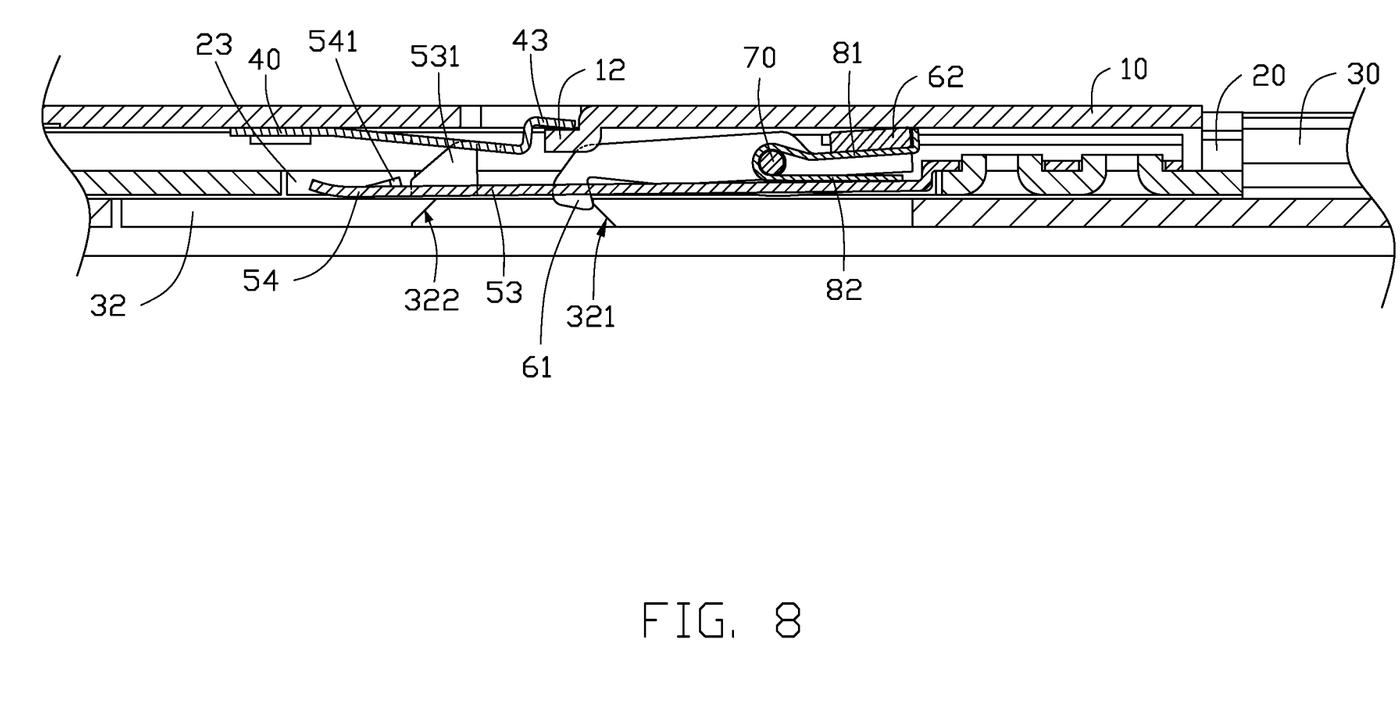
FIG. 8 is a cross-sectional view of the slide rail in a pulling state.
Figure 9:
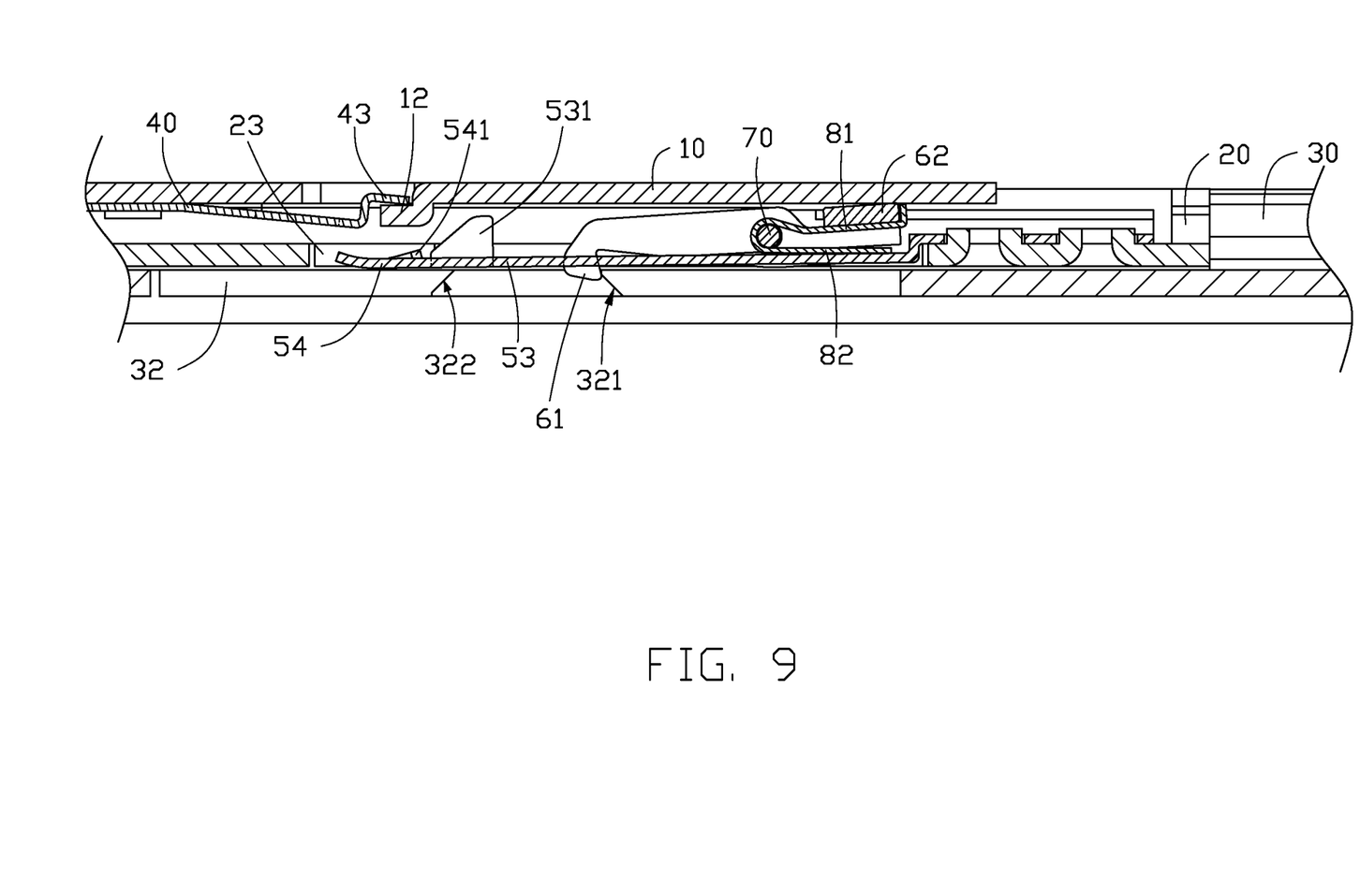
FIG. 9 is a cross-sectional view of the slide rail in a pulling or retracting state.

Referring to FIG. 7, when the slide rail 100 is in an initial state (a retracted state), the third resilient member 80 is in a compressed state, the spring piece 53 of the second resilient member 50 is received in the receiving slot 23 of the second rail 20, and the first resilient member 40 is engaged with the first protrusions 531 of the spring piece 53. When the first rail 10 is pulled, the second rail 20 moves along the third rail 30 with the first rail 10. Referring to FIG. 8 and FIG. 9, when the receiving slot 23 of the second rail 20 is aligned with the through slot 32 of the third rail 30, the front ends of the hooks 61 of the locking number 60 and the spring piece 53 of the second resilient member 50 enter the through slot 32 under the action of the third resilient member 80. Then, the front ends of the hooks 61 hook onto the first step surface 321 of the through slot 32, the spring piece 53, the resisting portion 54, and the second protrusions 541 enter the through slot 32, and the first protrusions 531 of the spring piece 53 are separated from the first resilient member 40 to limit a position of the second rail 20 at the through slot 32. Then, the first rail 10 can continue to move along the second rail 20 for the purpose of extending the slide rail 100.

During the further movement of the first rail 10, the second rail 20 may continue to move a small distance along with the first rail 10 due to a frictional force between the first rail 10 and the second rail 20. When the resisting portion 54 abuts a front wall of the through slot 32, the second rail 20 stops moving. After the first rail 10 is separated from the second rail 20, the second rail 20 can move a small extent within a length of the through slot 32, and a shape of the spring piece 53 can be adjusted to avoid jamming.

When the first rail 10 is retracted and moved to a position of the second resilient member 50, a tail end of the first rail 10 presses the connecting plate 62 of the locking member 60 to overcome the elastic force of the first support portion 81 of the third resilient member 80 to cause the hooks 61 to lift up and separate from the first step surface 321 of the through slot 32. A frictional force between the first rail 10 and the second rail 20 drives the second rail 20 to move along with the first rail 10. The receiving slot 23 is offset from the through slot 32. The third resilient member 80 is pressed. The spring piece 53 is removed from the through slot 32 by the elastic force and moved toward the receiving slot 23. An inclined surface of the first protrusions 531 raises a curved end of the first resilient member 40 during the movement of the first rail 10, so that the first resilient member 40 passes over the first protrusions 531, and the latching slots 42 are re-engaged with the first protrusions 531. Then, the second rail 20 moves together with the first rail 10 to the initial position to complete a reset process of the slide rail 100.

The slide rail 100 utilizes the first resilient member 40, the second resilient member 50, and the locking member 60 to cause the first rail 10 to drive the second rail 20 to move along with the first rail 10. The receiving slot 23 of the second rail 20 and the through slot 32 of the third rail 30 limit the second rail 20 on the third rail 30, to make the first rail 10 continue to slide on the second rail 20 for the purpose of extending the slide rail 100.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A slide rail comprising:
a first rail;
a second rail, the first rail being slidably mounted on the second rail;
a third rail, the second rail being slidably mounted on the third rail;
a first resilient member mounted on the first rail;
a second resilient member comprising a fixing plate and a spring piece coupled to the fixing plate; and
a locking member rotationally mounted on the second resilient member; wherein:

the fixing plate is fixedly mounted on the second rail;
an end of the spring piece is latched with the first resilient member;
the second rail defines a receiving slot;
the spring piece and the locking member are received in the receiving slot;
the third rail defines a through slot;
when the first rail is configured to be pulled out, the first resilient member drives the second resilient member to move along with the first resilient member to pull the second rail, when the receiving slot is configured to be aligned with the through slot, the spring piece and the locking member fall into the through slot, the spring piece separates from the first resilient member, the locking member latches onto a first step surface of the through slot to limit movement of the second rail, and the first rail continues to move.

2. The slide rail of claim 1, wherein:
the locking member comprises hooks located on sides of the spring piece; and
the hooks are rotationally coupled to an end of the fixing plate adjacent to the spring piece by a pin;
when the receiving slot is configured to be aligned with the through slot, the hooks latch onto the first step surface of the through slot.

3. The slide rail of claim 2, further comprising a third resilient member located between the locking member and the spring piece, wherein:
one end of the third resilient member abuts against base ends of the hooks, and another end of the third resilient member abuts against an end of the spring piece adjacent to the fixing plate.

4. The slide rail of claim 3, wherein:
the locking member comprises at least two hooks;
the at least two hooks are respectively located on two sides of the spring piece;
the base ends of the hooks are coupled together by a connecting plate; and
the one end of the third resilient member abuts against the connecting plate.

5. The slide rail of claim 4, wherein:
when the first rail is configured to be retracted, the first rail presses the connecting plate to cause the hooks to separate from the first step surface, the first rail drives the second rail to move, the receiving slot is offset from the through slot, the spring piece and the hooks slide out of the through slot, and the first resilient member is latched with the spring piece.

6. The slide rail of claim 3, wherein:
an end of the fixing plate coupled to the spring piece comprises support arms located on two sides of the spring piece; and
the hooks are rotationally coupled to the support arms by the pin.

7. The slide rail of claim 3, wherein:
the third resilient member is sleeved on the pin.

8. The slide rail of claim 1, wherein:
the first resilient member defines latching slots;
an end of the spring piece away from the fixing plate comprises first protrusions; and
the first protrusions are configured to latch in the latching slots.

9. The slide rail of claim 8, wherein:
the end of the spring piece away from the fixing plate comprises a resisting portion;
a side of the resisting portion facing the first protrusion comprises second protrusions;
the second protrusions are located on sides of the spring piece;
the through slot comprises a second step surface;
when the spring piece is configured to enter the through slot, the second protrusion falls into the through slot from a front end of the second step surface.

10. The slide rail of claim 9, wherein:
an end of the resisting portion away from the spring piece is bent toward the first rail.

11. The slide rail of claim 10, wherein:
an end of the third rail comprises a stopping block for blocking the second rail to prevent the second rail from falling out of the third rail during a retracting process.

12. The slide rail of claim 11, wherein:
the first rail comprises a first buckle;
an end of the first resilient member comprises a second buckle corresponding to the first buckle; and
the first resilient member is mounted on the first rail, the first buckle abuts against the second buckle.

13. A slide rail comprising:
a first rail;
a second rail, the first rail being slidably mounted on the second rail;
a third rail, the second rail being slidably mounted on the third rail;
a first resilient member mounted on the first rail;
a second resilient member comprising a fixing plate and a spring piece coupled to the fixing plate;
a third resilient member; and
a locking member rotationally mounted on the second resilient member; wherein:
the fixing plate is fixedly mounted on the second rail;
an end of the spring piece is latched with the first resilient member;
the second rail defines a receiving slot;
the spring piece and the locking member are received in the receiving slot;
the third rail defines a through slot;
the locking member comprises hooks located on sides of the spring piece;
the hooks are rotationally coupled to an end of the fixing plate adjacent to the spring piece by a pin;
when the first rail is configured to be pulled out, the first resilient member drives the second resilient member to move along with the first resilient member to pull the second rail, when the receiving slot is configured to be aligned with the through slot, the spring piece and the locking member fall into the through slot, the spring piece separates from the first resilient member, the hooks latch onto a first step surface of the through slot to limit movement of the second rail, and the first rail continues to move.

14. The slide rail of claim 13, wherein:
an end of the fixing plate coupled to the spring piece comprises support arms located on two sides of the spring piece; and
the hooks are rotationally coupled to the support arms by the pin.

15. The slide rail of claim 13, wherein:
the first resilient member defines latching slots;
an end of the spring piece away from the fixing plate comprises first protrusions; and
the first protrusions are configured to latch in the latching slots.

* * * * *